(12) United States Patent
Carretero Jacinto et al.

(10) Patent No.: US 11,407,366 B2
(45) Date of Patent: Aug. 9, 2022

(54) BRACKET FOR A PILLAR ASSEMBLY

(71) Applicant: Ford Global Technologies, LLC, Dearborn, MI (US)

(72) Inventors: Ivan Carretero Jacinto, Alvaro Obregon (MX); Liliana Alonso Vazquez, Alvaro Obregon (MX)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 17/084,966

(22) Filed: Oct. 30, 2020

(65) Prior Publication Data

US 2022/0134965 A1 May 5, 2022

(51) Int. Cl.
*B60R 13/02* (2006.01)

(52) U.S. Cl.
CPC ........ *B60R 13/025* (2013.01); *B60R 13/0206* (2013.01)

(58) Field of Classification Search
CPC .......................... B60R 13/0206; B60R 13/025
USPC ....................................................... 296/1.08
See application file for complete search history.

(56) References Cited

U.S. PATENT DOCUMENTS

| | | | |
|---|---|---|---|
| 8,162,387 B1 | 4/2012 | Nydam et al. | |
| 9,321,417 B1 * | 4/2016 | Lepper | B60R 21/201 |
| 9,776,494 B2 | 10/2017 | Shynn et al. | |
| 2003/0146607 A1 * | 8/2003 | Ohki | B60R 21/232 |
| | | | 280/730.2 |
| 2012/0168579 A1 | 7/2012 | Heersink | |
| 2013/0205546 A1 | 8/2013 | Vemulapati et al. | |
| 2018/0126925 A1 | 5/2018 | Villacres Mesias | |

FOREIGN PATENT DOCUMENTS

| | | | | |
|---|---|---|---|---|
| CN | 101428599 A * | 5/2009 | | B60R 21/213 |
| EP | 3170472 A2 | 5/2017 | | |

* cited by examiner

*Primary Examiner* — D Glenn Dayoan
*Assistant Examiner* — Melissa Ann Bonifazi
(74) *Attorney, Agent, or Firm* — Vichit Chea; Price Heneveld LLP (57) ABSTRACT

A bracket for a vehicle includes a first surface that defines support ribs and a second surface. A cantilevered end defines an attachment aperture. A retention feature is coupled to an upper edge of the cantilevered end and defines a retention notch. A central portion defines an arcuate notch and a fastening aperture. An attachment end includes a coupling feature that extends outwardly from the first surface.

20 Claims, 11 Drawing Sheets

BRACKET FOR A PILLAR ASSEMBLY

FIELD OF THE DISCLOSURE

The present disclosure generally relates to a pillar assembly for a vehicle. More specifically, the present disclosure relates to a bracket for a pillar assembly.

BACKGROUND OF THE DISCLOSURE

Vehicles include trim panels, seatbelts, curtain airbags, and ducts used for ventilation and climate control. Typically, a multitude of brackets are used to attach various features to the pillars. Multiple brackets are used to avoid penetrating the ducts while providing routing options for hoses and attachment points for trim panels.

SUMMARY OF THE DISCLOSURE

According to a first aspect of the present disclosure, a pillar assembly for a vehicle, includes a pillar, a pivoting bracket coupled to the pillar, a duct proximate to the pillar, and a bracket coupled to the pillar. The bracket includes a first surface and a second surface. A cantilevered end extends past the duct and defines a raised attachment portion. A retention feature is coupled to the cantilevered end. A central portion defines a notch and a fastening aperture. An attachment end includes a coupling feature. The attachment end is coupled to the pillar via the coupling feature.

Embodiments of the first aspect of the disclosure can include any one or a combination of the following features:
  the raised attachment portion defines an attachment aperture and an attachment feature extends through the attachment aperture;
  the pivoting bracket is selectively disposed within the notch defined by the central portion;
  a trim panel is operably coupled to the cantilevered end of the bracket;
  the cantilevered end retains the trim panel over the duct;
  one or more ribs defined by the first surface are configured to brace the bracket;
  the central portion further defines a locating aperture proximate to the notch; and/or
  a trim panel includes a locating feature that extends through the locating aperture, wherein the locating feature aligns the trim panel relative to the pillar.

According to a second aspect of the present disclosure, a pillar assembly includes a pillar and a bracket operably coupled to the pillar. The bracket includes an attachment end that has a coupling feature. The attachment end is coupled to the pillar via the coupling feature. A central portion defines a notch and a fastening aperture. A cantilevered end defines a raised attachment portion. A fastener is operably coupled to the cantilevered end and extends through the raised attachment portion.

Embodiments of the second aspect of the disclosure can include any one or a combination of the following features:
  a duct is proximate to the pillar, wherein the cantilevered end of the bracket extends beyond the pillar over the duct;
  a trim panel is coupled to the cantilevered end via the fastener, wherein the trim panel covers the duct;
  the central portion further defines a locating aperture proximate to the notch, and wherein the trim panel includes a locating feature that extends through the locating aperture to align the trim panel relative to the pillar;
  the bracket further includes a retention feature that extends from an upper edge of the cantilevered end; and/or
  the retention feature defines a retention notch configured to receive a hose of said pillar assembly.

According to a third aspect of the present disclosure, a bracket for a vehicle includes a first surface that defines support ribs and a second surface. A cantilevered end defines an attachment aperture. A retention feature is coupled to an upper edge of the cantilevered end and defines a retention notch. A central portion defines an arcuate notch and a fastening aperture. An attachment end includes a coupling feature that extends outwardly from the first surface.

Embodiments of the third aspect of the disclosure can include any one or a combination of the following features:
  the cantilevered end includes a raised attachment portion;
  the attachment aperture is defined by the cantilevered end and is further defined by the raised attachment portion;
  a peripheral wall defines the first surface;
  a fastener extends through the attachment aperture that is defined by the raised attachment portion;
  a first portion of the fastener is positioned proximate to the first surface and a second portion of the fastener extends outwardly from the second surface;
  the first surface is recessed relative to the peripheral wall;
  the retention notch is defined by the retention feature and is configured to receive a hose of the vehicle; and/or
  a fastening portion is coupled to the central portion and defines the fastening aperture.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the presently disclosed device will be set forth in the detailed description which follows and will be apparent to those skilled in the art from the description, or recognized by practicing the device as described in the following description, together with the claims and appended drawings.

Figure 1:
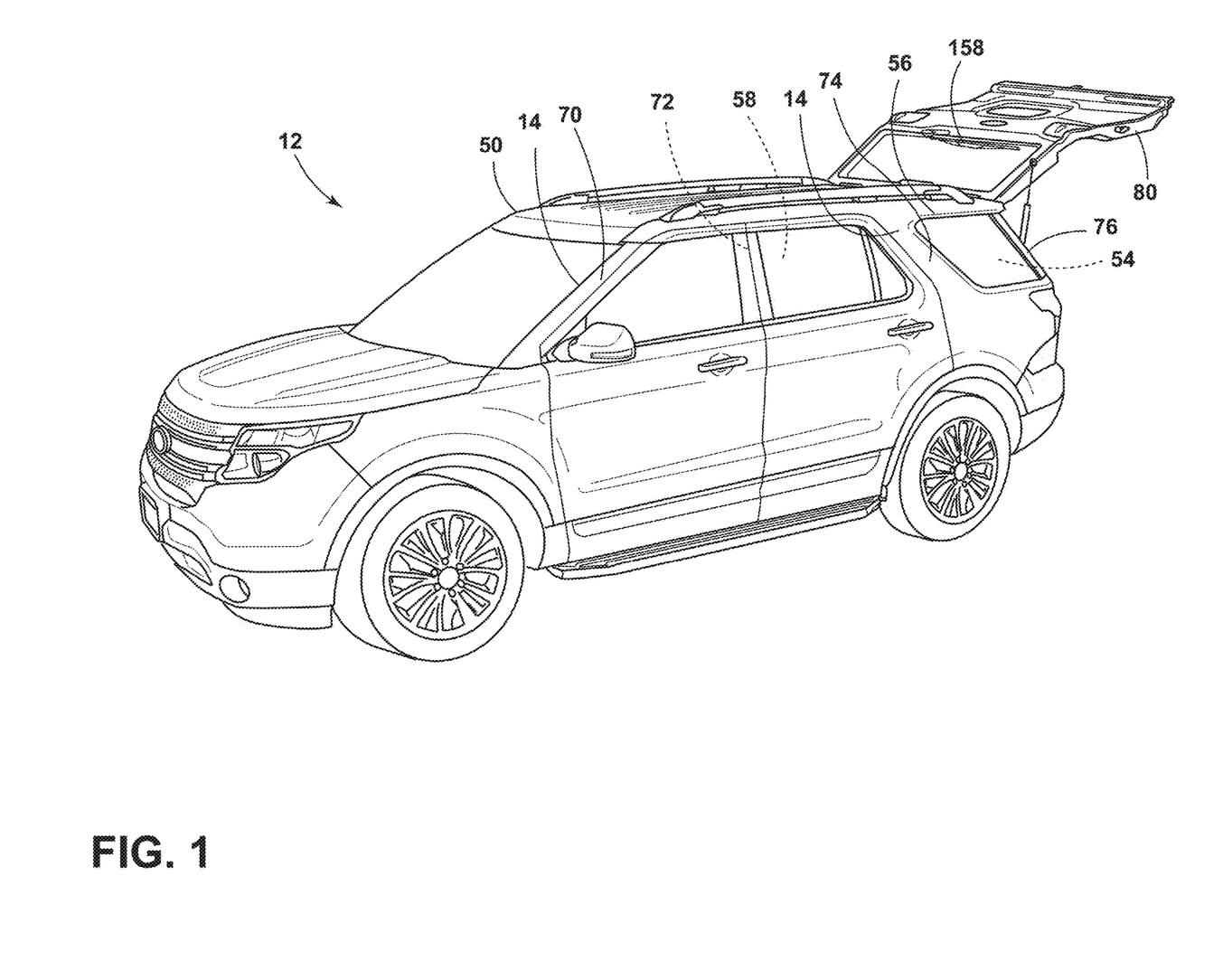
FIG. 1 is a side perspective view of a vehicle of the present disclosure.
Figure 2:
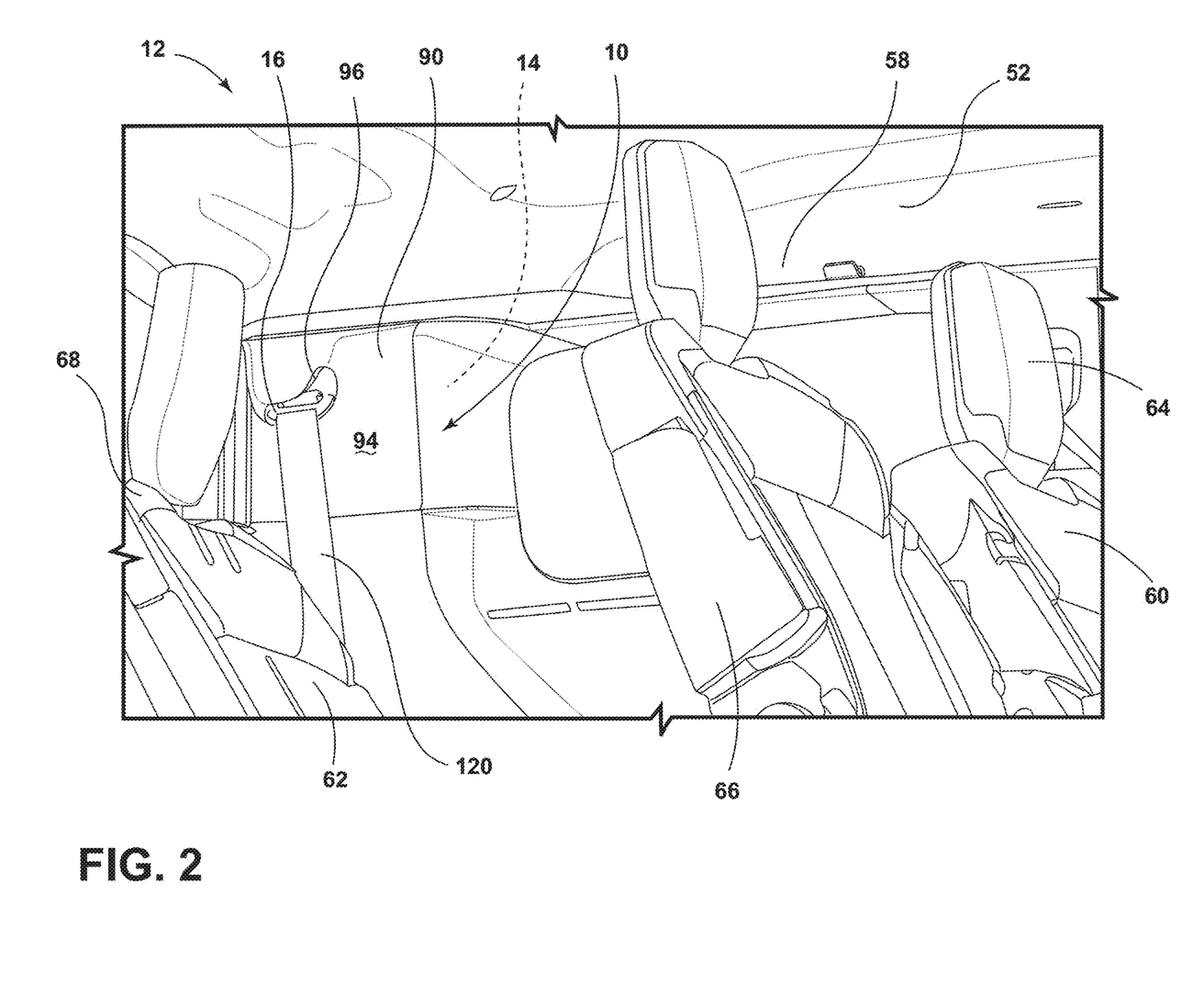
FIG. 2 is an enlarged partial side perspective view of a pillar assembly of the present disclosure within a passenger compartment of a vehicle.
Figure 3:
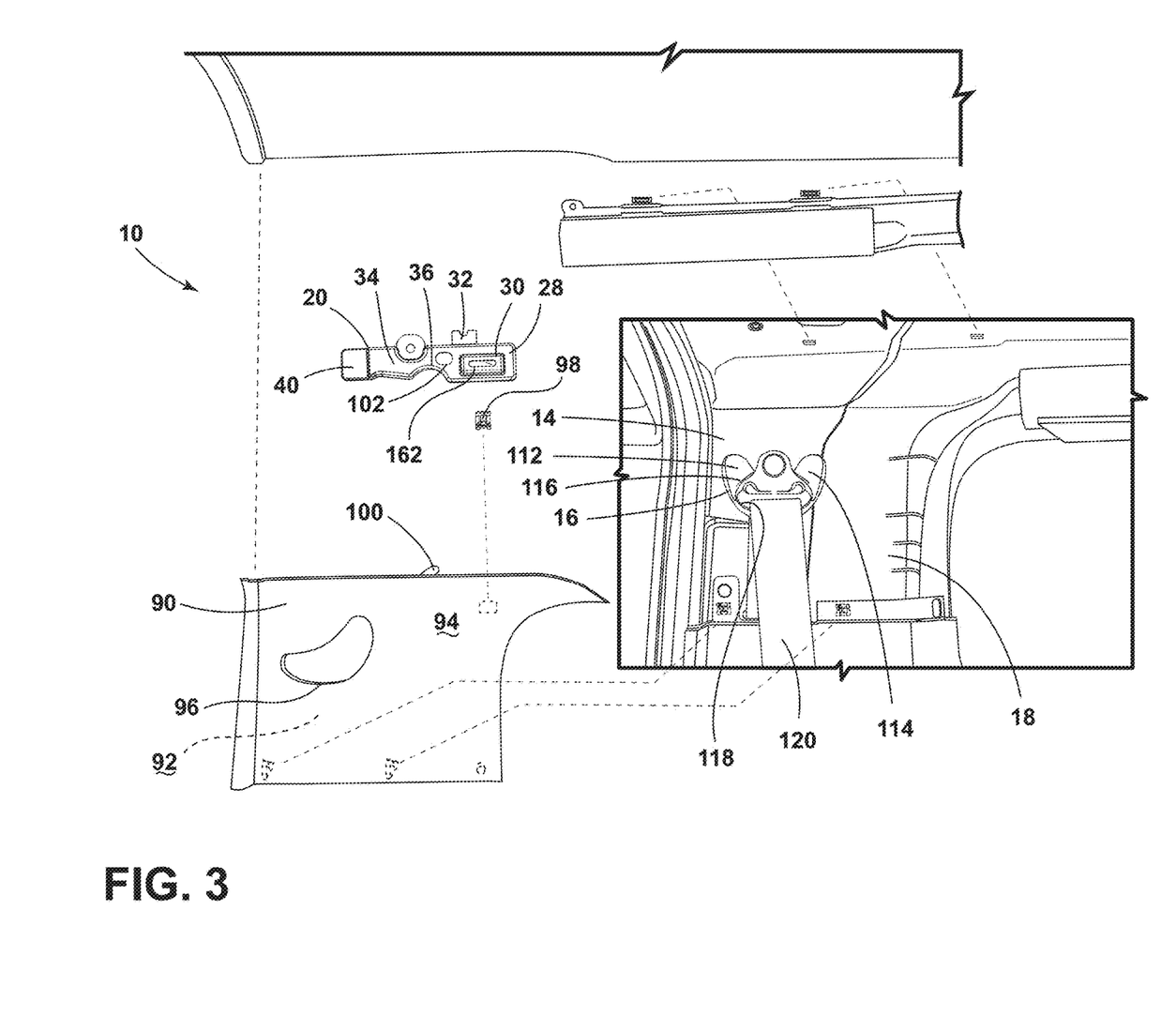
FIG. 3 is an exploded side perspective view of a pillar assembly of the present disclosure.
Figure 4:
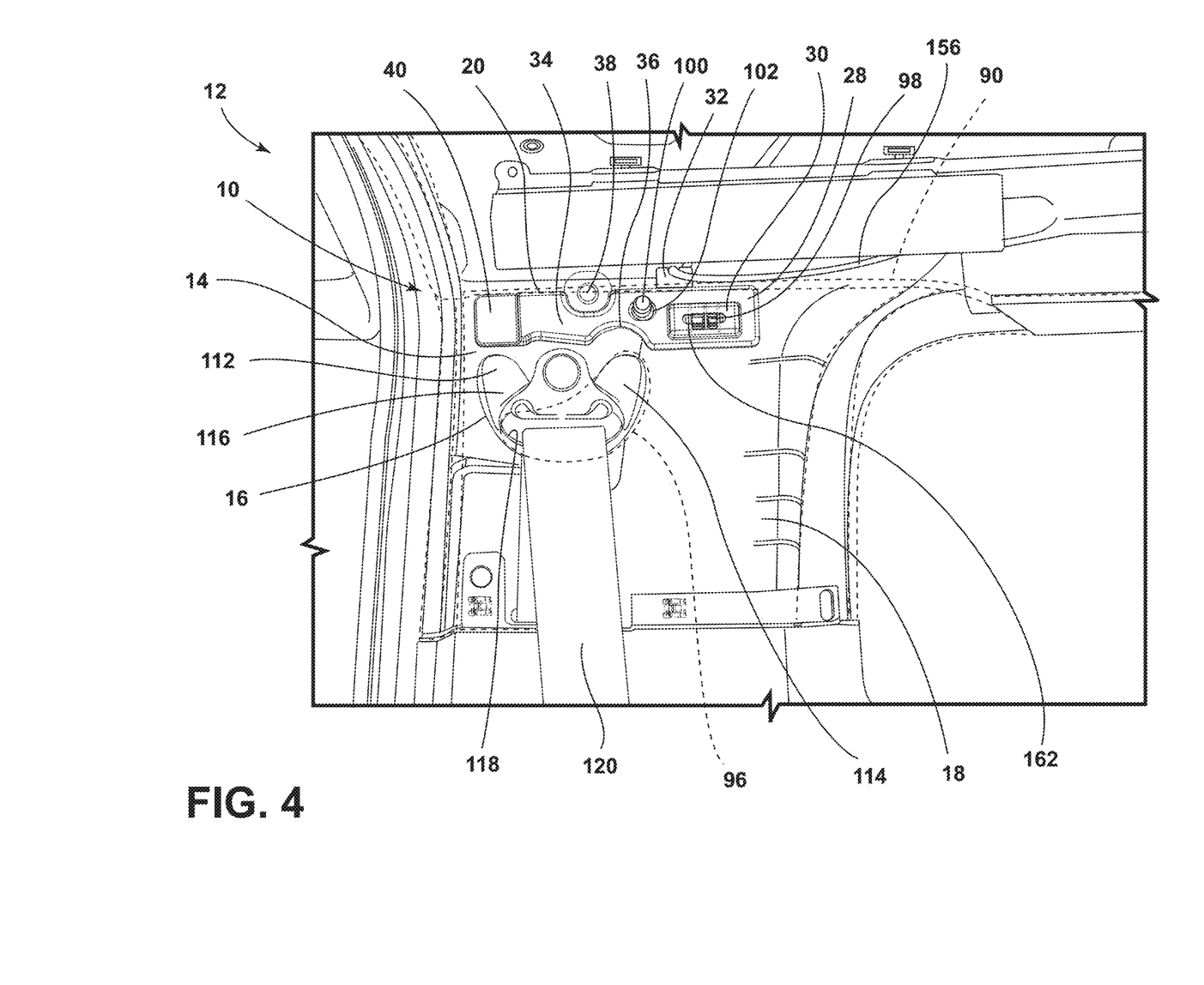
FIG. 4 is an enlarged partial side perspective view of a bracket and a pivoting bracket of the present disclosure.
Figure 5:
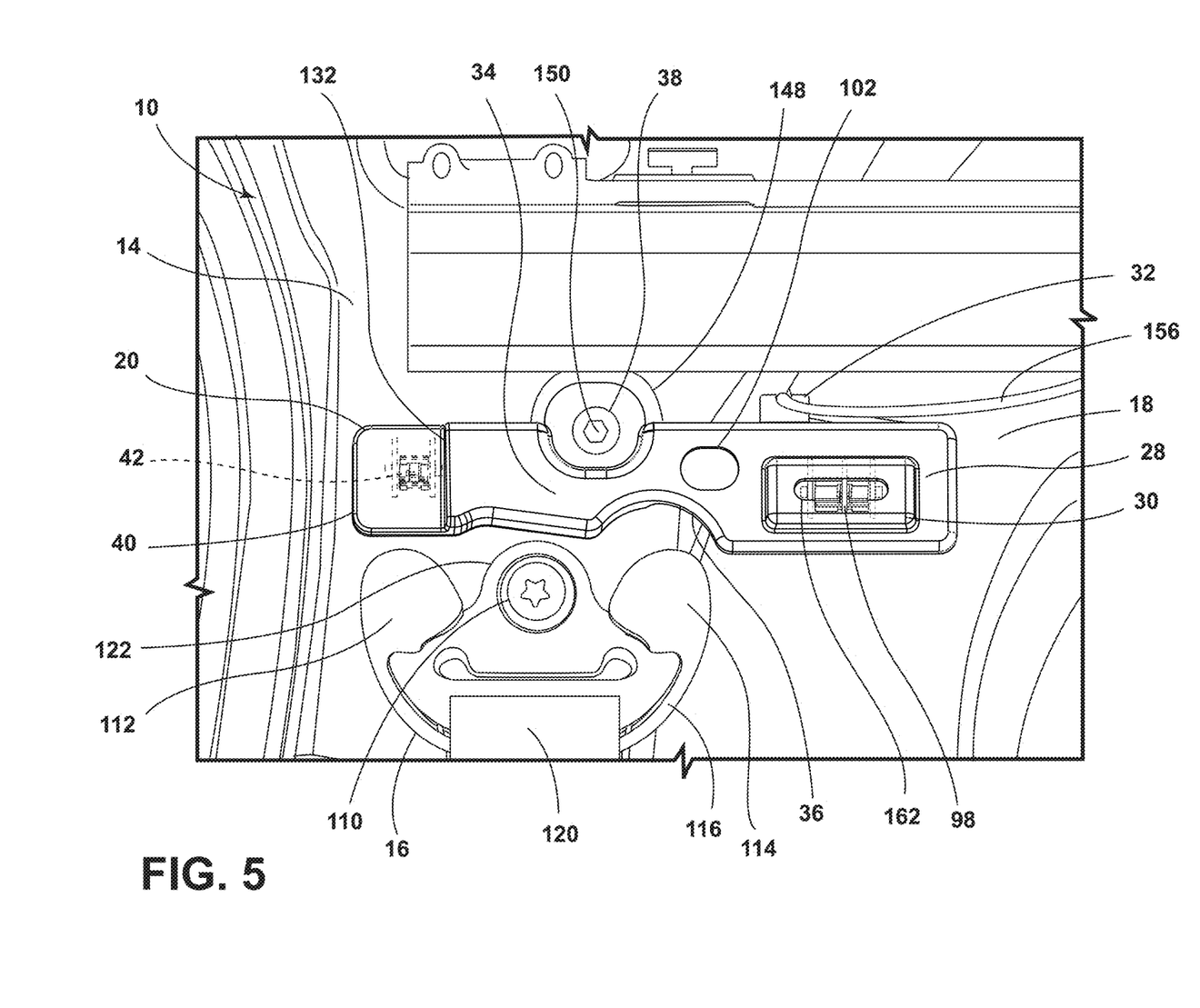
FIG. 5 is an enlarged partial side perspective view of a bracket and a pivoting bracket of the present disclosure with the pivoting bracket in a neutral position.
Figure 6:
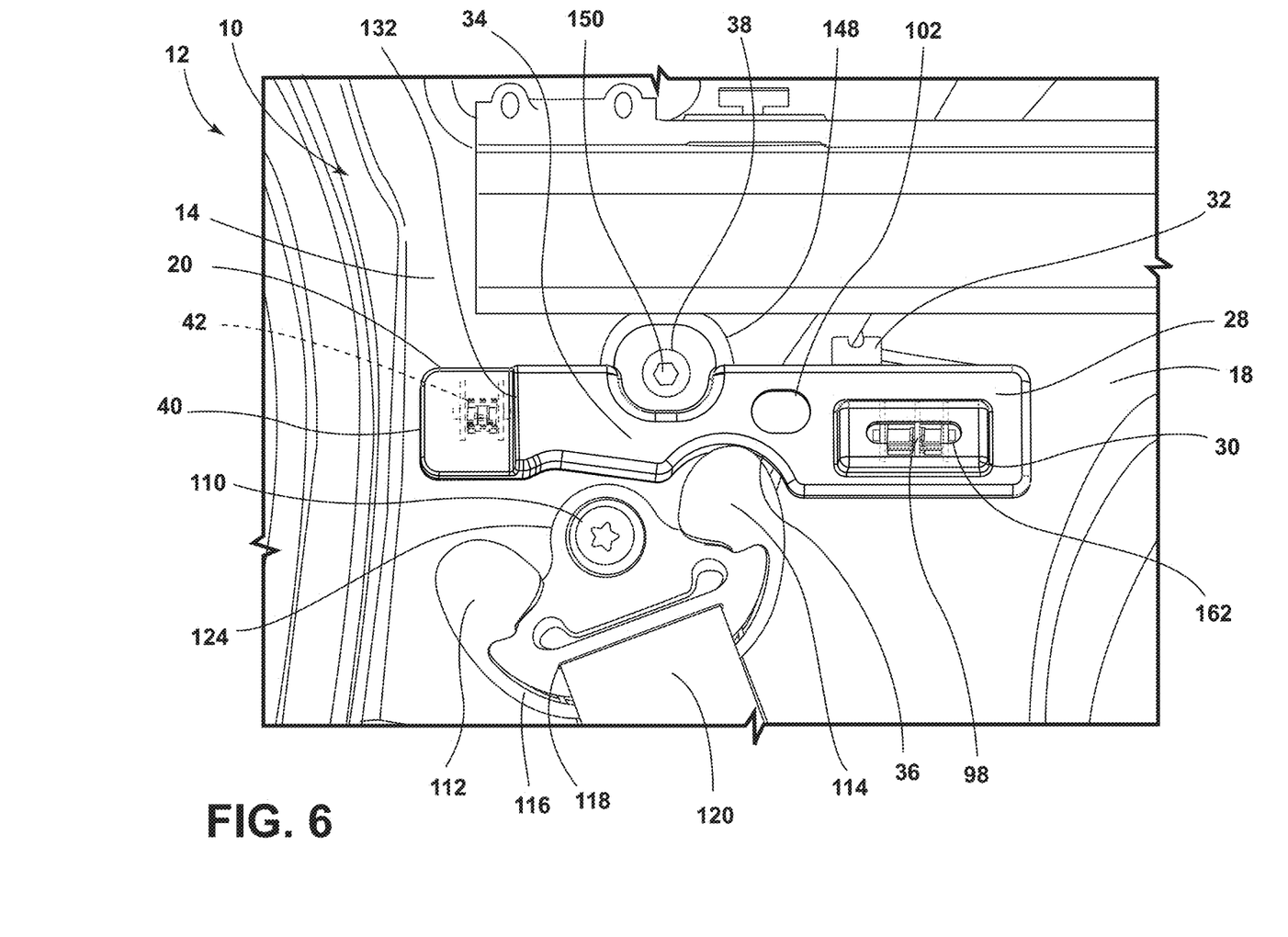
FIG. 6 is an enlarged partial side perspective view of the bracket and the pivoting bracket of FIG. 5 with the pivoting bracket in an extended position.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-12, reference number 10 generally refers to a pillar assembly for a vehicle 12. The pillar assembly 10 includes a pillar 14 and a pivoting bracket 16 that is coupled to the pillar 14. A duct 18 is positioned proximate to the pillar 14, and a bracket 20 is coupled to the pillar 14. The bracket 20 has a first surface 22 and a second surface 24. A cantilevered end 28 of the bracket 20 extends past the duct 18 and defines a raised attachment portion 30. A retention feature 32 is coupled to the cantilevered end 28 of the bracket 20, and a central portion 34 of the bracket 20 defines a notch 36 and fastening apertures 38. An attachment end 40 of the bracket 20 includes a coupling feature 42. The attachment end 40 is coupled to the pillar 14 via the coupling feature 42.

Referring to FIGS. 1-4, the vehicle 12 includes a vehicle body 50 which defines an interior 52 of the vehicle 12. A cargo space 54 is further defined within the interior 52 of the vehicle 12, such that the cargo space 54 is defined toward a rear portion 56 of the vehicle 12. The vehicle 12 may also define a passenger compartment 58 within the interior 52 of the vehicle body 50. The passenger compartment 58 may include a first seating row 60 and a second seating row 62. Fewer or more seating rows may be included in the vehicle 12, without departing from the teachings herein. The first seating row 60 may include a driver seat 64 and a passenger seat 66. The second seating row 62 may include rear passenger seats 68. The rear passenger seat 68 of the second seating row 62 may include bucket seating or may be bench seating.

In various examples, the vehicle 12 is a wheeled motor vehicle 12, which may be a sedan, a sport utility vehicle, a truck, a van, a crossover, and/or other styles of vehicle. The vehicle 12 may be a manually operated vehicle (e.g., with a human driver), a fully autonomous vehicle (e.g., no human driver), or a partially autonomous vehicle (e.g., may be operated with or without a human driver). Additionally, the vehicle 12 may be utilized for personal and/or commercial purposes, such as ride-providing services (e.g., chauffeuring) and/or ride-sharing services.

The vehicle body 50 includes an A-pillar 70 proximate to each of the driver seat 64 and the passenger seat 66. The vehicle body 50 may also include a B-pillar 72, a C-pillar 74, and a D-pillar 76. The B-pillar 72 is typically positioned between the first seating row 60 and the second seating row 62, and the C-pillar 74 is positioned proximate to the second seating row 62. In some vehicle configurations, the C-pillar 74 may be positioned between the second seating row 62 and the cargo space 54 of the vehicle 12. The D-pillar 76 is typically utilized in larger vehicles, such as sport-utility vehicles, such that the cargo space 54 may be generally accessible from the second seating row 62. Additionally or alternatively, the rear passenger seats 68 of the vehicle 12 may be positioned proximate to the cargo space 54 and the D-pillar 76. Typically, the D-pillar 76 may be positioned near the rear portion 56 of the vehicle 12 proximate to a cargo door 80. It is generally contemplated that the pillar 14 described herein may be any one of the A-pillar 70, the B-pillar 72, the C-pillar 74, or the D-pillar 76. For purposes of this disclosure, the pillar 14 described herein will be described in relation to the C-pillar 74.

With further reference to FIGS. 1-4, the pillar assembly 10 may be used with any one of the pillars 14 described above, and the duct 18 is positioned adjacent to the pillar 14, described below. The duct 18 generally provides airflow and generally adjusts an environmental climate within the interior 52 of the vehicle 12 via climate controls. The duct 18 is generally formed from a hollow, metallic material. It is also contemplated that the duct 18 may also be formed from a polymeric material such as plastic or any other material generally known in the art to transport the airflow within the interior 52 of the vehicle 12. The duct 18 is generally positioned proximate to the pillar 14, such that the duct 18 and the pillar 14 may be covered by a single trim panel 90.

The trim panel 90 may be formed from a rigid material that includes an inner surface 92 and an outer surface 94, such that the outer surface 94 may include a fabric covering. The outer surface 94 may provide the trim panel 90 with an aesthetic appearance based on the various colors and materials that may be used for the fabric covering. Additionally or alternatively, the outer surface 94 of the trim panel 90 may be formed from a polymeric material or another generally rigid material. The trim panel 90 may define an aperture 96 through which the pivoting bracket 16 may extend, described further below. The aperture 96 may be generally crescent-shaped. However, it is also contemplated that the aperture 96 may have any shape generally known in the art and may generally correspond to the shape of the pivoting bracket 16.

Referring still to FIGS. 1-4, the bracket 20 is coupled to the pillar 14 and generally extends across the duct 18 to couple the trim panel 90 to the pillar 14. Specifically, the trim panel 90 is operably coupled to the bracket 20 via the cantilevered end 28, as described in more detail below. A trim fastener 98 may extend through the raised attachment portion 30 of the cantilevered end 28 and may couple to the trim panel 90. The trim fastener 98 may also be referred to as an attachment feature or a fastener more generally. It is generally contemplated that the trim fastener 98 may be similar to the coupling feature 42 coupled to the attachment end 40 of the bracket 20. The trim fastener 98 extends through the raised attachment portion 30, such that a first portion of the trim fastener 98 is positioned proximate to the first surface 22 and a second portion of the trim fastener 98 extends outwardly from the second surface 24. The attachment of the trim panel 90 to the cantilevered end 28 of the bracket 20 covers the duct 18 with the trim panel 90 while keeping the duct 18 free from penetration. In addition, the trim panel 90 may include a locating feature 100 that may extend through a locating aperture 102 of the bracket 20. The locating feature 100 may extend through the locating aperture 102 to properly align the trim panel 90 relative to the pillar 14 and the duct 18.

Additionally or alternatively, the locating feature 100 may be configured to at least partially couple the trim panel 90 to the bracket 20. As generally mentioned above, the pillar 14 may be formed from a metal material, such as sheet metal that may be penetrated by the coupling feature 42 operably coupled to the attachment end 40, and the trim fastener 98 that extends through the raised attachment portion 30 and the locating feature 100 may couple the trim panel 90 to the pillar 14 via the bracket 20. Stated differently, the coupling feature 42 may penetrate the sheet metal of the pillar 14 to couple the bracket 20 to the pillar 14, and the trim fastener 98 may couple the trim panel 90 to bracket 20.

With reference now to FIGS. 3-6, the pivoting bracket 16 is operably coupled to the pillar 14 via a fastening member 110. The pivoting bracket 16 is generally positioned proximate to the bracket 20, such that the pivoting bracket 16 may be disposed beneath the bracket 20 on the pillar 14. The pivoting bracket 16 includes a first end 112, a second end 114, and a body 116 that defines a slit 118. It is generally contemplated that the pivoting bracket 16 may be operably coupled to a restraint belt 120 that extends through the slit 118 defined by the body 116.

The pivoting bracket 16 is configured to pivot within the aperture 96 defined by the trim panel 90, such that the second end 114 may rotate in an upward direction behind the trim panel 90. The first end 112 of the body 116 follows the rotation and may be at least partially exposed relative to the second end 114 of the pivoting bracket 16 as the second end 114 rotates upward. Typically, the pivoting bracket 16 pivots during use by an occupant of the vehicle 12. For example, the occupant may pull on the restraint belt 120 to adjust the restraint belt 120. The movement of the restraint belt 120 by the occupant may pivot the second end 114 of the pivoting bracket 16 upward.

The pivoting bracket 16 is operable between a neutral position 122 and an extended position 124, such that the pivoting bracket 16 may pivot between the neutral position 122 and the extended position 124. It is generally contemplated that the second end 114 of the pivoting bracket 16 is at least partially disposed within the notch 36 in the extended position 124 of the pivoting bracket 16, and the first end 112 may be partially exposed within the aperture 96 of the trim panel 90. As mentioned above, the pivoting bracket 16 may have a generally crescent-shape that corresponds with the aperture 96 defined in the trim panel 90. However, the pivoting bracket 16 and the aperture 96 may have an alternate shape such as rectangular, square, triangular, or any other shape generally known in the art.

Referring to FIGS. 5-9, the bracket 20 is operably coupled to the pillar 14 via the coupling feature 42, which is operably coupled to the attachment end 40 of the bracket 20. As mentioned above, the bracket 20 includes the first surface 22 and the second surface 24. The first surface 22 may be surrounded and generally defined by a peripheral wall 130, such that the first surface 22 may be generally recessed relative to the peripheral wall 130. The first surface 22 of the bracket 20 generally defines ribs 26 along each of the cantilevered end 28, the central portion 34, and the attachment end 40 of the bracket 20. The ribs 26 may provide structural support for the bracket 20, such that the ribs 26 may maintain the structural integrity of the bracket 20 upon application of a predetermined level of force, described in further detail below.

On the second surface 24, the attachment end 40 may include a ledge 132, such that the attachment end 40 may be generally offset from the central portion 34 and the cantilevered end 28 of the bracket 20. Stated differently, the attachment end 40 is set back from the central portion 34 and the cantilevered end 28. The ledge 132 of the attachment end 40 may be angled, such that a base 134 of the ledge 132 may extend further away from a portion of the second surface 24 along the attachment end 40 than a top portion 136 of the ledge 132. The attachment end 40 may also define a cavity 138 on the first surface 22 of the bracket 20 in which the coupling feature 42 may be disposed, such that the first surface 22 along the attachment end 40 is recessed relative to the peripheral wall 130 to define the cavity 138. The bracket 20 is coupled to the pillar 14 via the coupling feature 42.

Figure 7:
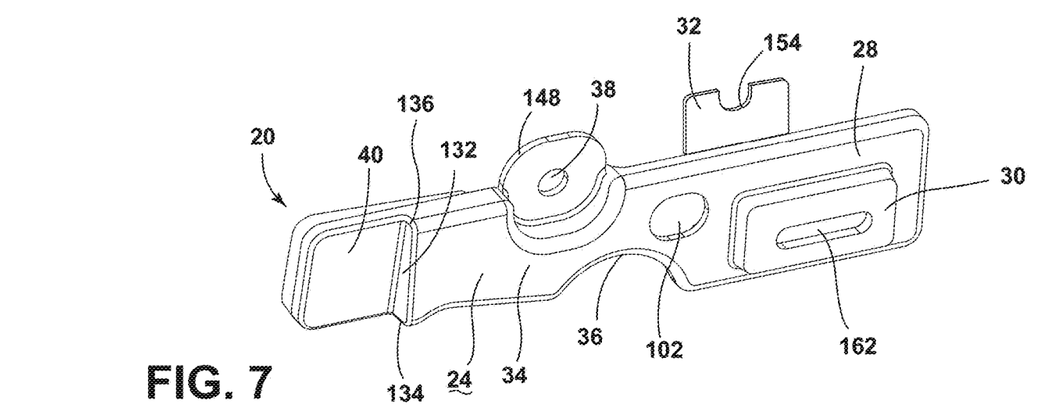
FIG. 7 is a front perspective view of a bracket of the present disclosure.
Figure 8:
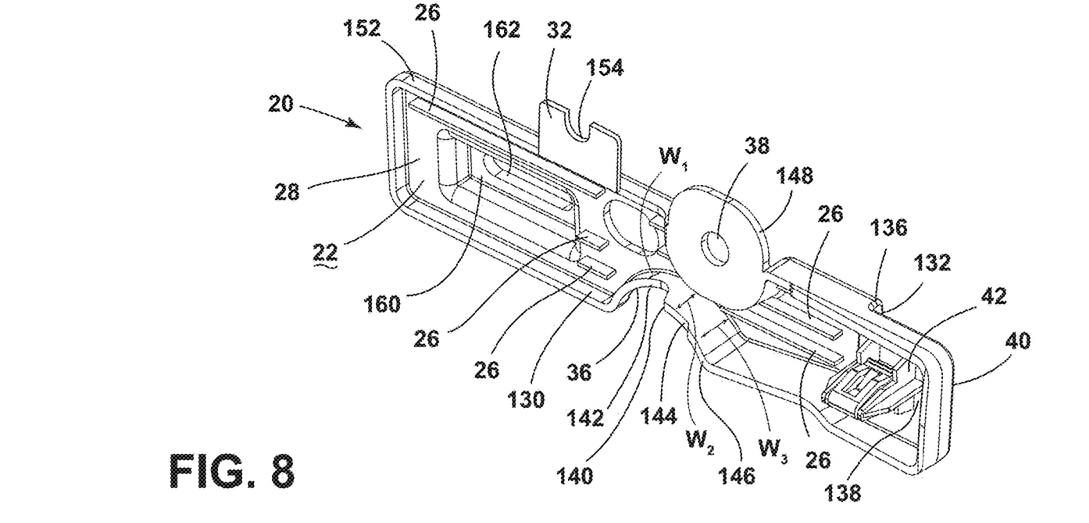
FIG. 8 is a rear perspective view of the bracket of FIG. 7.

As illustrated in FIGS. 7 and 8, the central portion 34 of the bracket 20 defines the notch 36 and the locating aperture 102. As mentioned above, the locating aperture 102 is configured to receive the locating feature 100 coupled to the trim panel 90, which aligns the trim panel 90 relative to the pillar 14. The locating aperture 102 may be generally oblong or elliptical in shape. However, it is also contemplated that the locating aperture 102 may be circular, rectangular, triangular, square, or any other shape generally known in the art. The locating aperture 102 is defined adjacent to the notch 36, such that the locating aperture 102 may be generally positioned above the notch 36 proximate to the cantilevered end 28 of the bracket 20.

As generally set forth above, the first surface 22 of the bracket 20 may be defined by the peripheral wall 130. The peripheral wall 130 may at least partially define the notch 36 that is defined by the central portion 34 of the bracket 20. The notch 36 may be generally arcuate in shape, such that the notch 36 may be described as an arcuate notch 36. It is also contemplated that the notch 36 may have other configurations or be other shapes generally known in the art. The notch 36 may include a stepped portion 140 that is defined by the peripheral wall 130 and is generally defined proximate to the first surface 22 of the bracket 20. The stepped portion 140 of the notch 36 may include a first portion 142, an intermediate, second portion 144, and a third portion 146. The first portion 142 generally extends from the peripheral wall 130 that is proximate to the cantilevered end 28.

The first portion 142 has a width $W_1$ that is narrower than a width $W_2$ of the intermediate portion 144 and a width $W_3$ of the third portion 146. The width $W_1$ of the first portion 142 may generally correspond with the width of the peripheral wall 130 between a fastening portion 148 that is coupled to the central portion 34, described below, and the intermediate portion 144. The width $W_3$ of the third portion 146 generally corresponds with the width of the peripheral wall 130 between the intermediate portion 144 and the attachment end 40 of the bracket 20.

Stated differently, the portion of the peripheral wall 130 that is proximate to the attachment end 40 and the intermediate portion 144 of the central portion 34 may be comparably wider than the portion of the peripheral wall 130 positioned around the cantilevered end 28 of the bracket 20. As mentioned above, the first, intermediate, and third portions 142, 144, 146 may vary in width relative to the first surface 22 and each at least partially define the peripheral wall 130. The varying widths $W_1$, $W_2$, $W_3$ of the first, intermediate, and third portions 142, 144, 146 may allow the bracket 20 to be coupled to the pillar 14 and extend past the pillar 14 toward the duct 18 while avoiding direct engagement of the bracket 20 with the duct 18. Thus, the portion of the peripheral wall 130 surrounding the cantilevered end 28 of the bracket 20 may be offset from the portion of the peripheral wall 130 surrounding the attachment end 40.

With reference to FIGS. 7-10, it is generally contemplated that the fastening portion 148, mentioned above, divides an upper portion of the peripheral wall 130 at the central portion 34 of the bracket 20. The fastening aperture 38 is defined within the fastening portion 148 of the bracket 20, and the fastening portion 148 of the bracket 20 may be generally recessed relative to the second surface 24 of the bracket 20. The fastening portion 148 may extend past the upper portion of the peripheral wall 130 relative to the first surface 22 to at least partially couple the bracket 20 to the pillar 14.

A second fastening member 150 extends through the fastening aperture 38 and may be generally flush with the second surface 24 of the bracket 20, as the fastening portion 148 may be recessed relative to the second surface 24 of the bracket 20. The fastening member 150 may be similar to the fastening member 110 that couples the pivoting bracket 16 to the pillar 14, such that the fastening member 150 couples the bracket 20 to the pillar 14 in a similar manner. It is also contemplated that the fastening member 150 may be recessed within the fastening portion 148 relative to the second surface 24 of the bracket 20, such that the second surface 24 is raised relative to the fastening member 150. Thus, the fastening member 150 may have minimal interference or engagement with the trim panel 90 that is coupled to the bracket 20. By way of example, not limitation, the fastening member 150 may be recessed within the fastening portion 148 at least about 15-millimeters to provide sufficient clearance for the trim panel 90. The fastening portion 148 generally extends past an upper edge 152 of the bracket 20, such that the fastening portion 148 may be generally parallel with the retention feature 32 of the bracket 20.

It is generally contemplated that the peripheral wall 130 may define the upper edge 152 of the bracket 20, which may further define the first surface 22 and the second surface 24 of the bracket 20. The retention feature 32 may be coupled to the upper edge 152 of the peripheral wall 130 proximate to the cantilevered end 28. Stated differently, the retention feature 32 may be coupled to the cantilevered end 28 on the upper edge 152, such that the retention feature 32 may extend from the upper edge 152 of the cantilevered end 28. It is also contemplated that the retention feature 32 may be integrally formed with the upper edge 152 of the bracket 20 and extend upward from the cantilevered end 28. The retention feature 32 defines a retention notch 154 that is configured to receive a hose 156 of the pillar assembly 10. The hose 156 may be configured to transport fluid, such as washer fluid, to a rear wiper 158 (FIG. 1) of the vehicle 12. The retention feature 32 retains the hose 156 above the bracket 20 and routes the hose 156 around the duct 18 between the pillar 14, the duct 18, and an inflatable curtain 164 (FIG. 11), described below.

With further reference to FIGS. 7-10, the raised attachment portion 30 of the cantilevered end 28 is generally defined on the second surface 24 of the bracket 20. Stated differently, the raised attachment portion 30 outwardly extends from the second surface 24 of the bracket 20 and may define a recess 160 on the first surface 22 of the bracket 20. The trim fastener 98 is disposed within the recess 160 and extends through an attachment aperture 162 defined by the raised attachment portion 30. The trim fastener 98, also called the fastener 98, may be generally flush with the first surface 22 of the bracket 20 to minimize potential engagement of the trim fastener 98 and the duct 18. The trim fastener 98 is coupled to the raised attachment portion 30 and is configured to couple the trim panel 90 to the bracket 20. The trim panel 90 is coupled to the cantilevered end 28 of the bracket 20 proximate to the duct 18, and the duct 18 and the pillar 14 are concealed by the trim panel 90.

Referring now to FIGS. 9-12, it is generally contemplated that the duct 18 and the trim panel 90 may be positioned proximate to the inflatable curtain 164 that is coupled to the vehicle body 50. The inflatable curtain 164 may be disposed behind a portion of the trim panel 90, and/or the inflatable curtain 164 may be disposed behind a separate trim feature.

The inflatable curtain 164 may also be referred to as a curtain airbag and is configured to deploy upon the application of a predetermined level of force, and the inflatable curtain 164 may partially engage the trim panel 90 and the bracket 20 upon the application of the predetermined level of force.

The ribs 26 defined along the first surface 22 of the bracket 20 may stabilize the bracket 20 and retain the trim panel 90 over the duct 18 and the pillar 14 as the inflatable curtain 164 is deployed. The inflatable curtain 164 may engage the trim panel 90, and the ribs 26 of the bracket 20 provide sufficient rigidity to the bracket 20 to counteract the force applied by the engagement of the inflatable curtain 164 to retain the trim panel 90 over the pillar 14 and the duct 18. As mentioned above, the ribs 26 are disposed along the first surface 22 on the cantilevered end 28, the central portion 34, and the attachment end 40. It is generally contemplated that a plurality of ribs 166 may be disposed on the central portion 34 and the attachment end 40 and a single rib 168 may be disposed on the cantilevered end 28. The single rib 168 may provide more flexibility for the cantilevered end 28 as compared to the plurality of ribs 166, which may generally provide more structural rigidity for the central portion 34 and the attachment end 40. Additionally or alternatively, the cantilevered end 28 may have more than the single rib 168, and the attachment end 40 may have less than the plurality of ribs 166.

Figure 9:
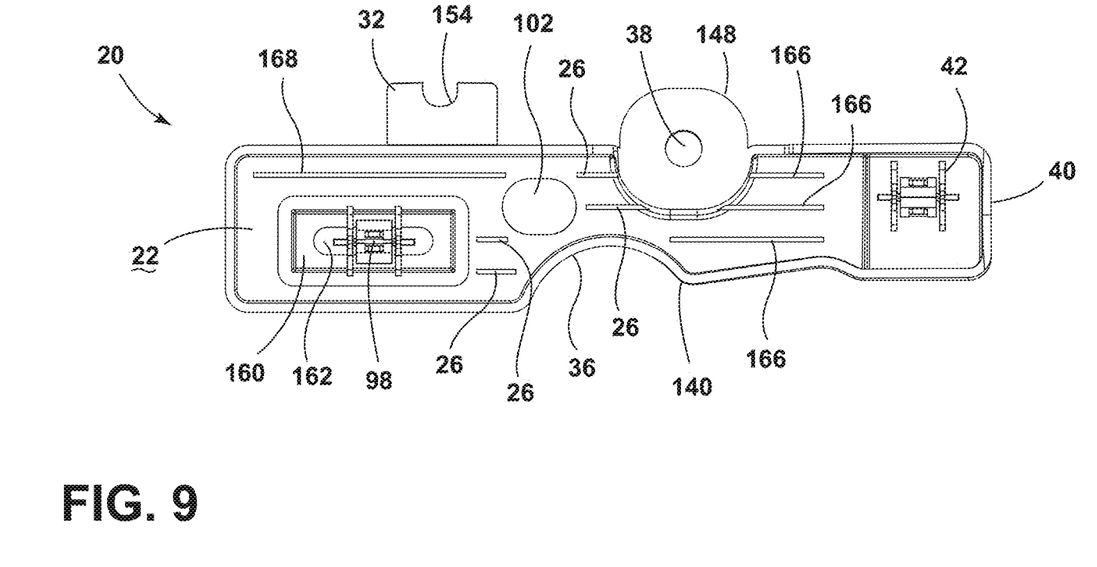
FIG. 9 is a rear elevational view of a bracket of the present disclosure.
Figure 10:
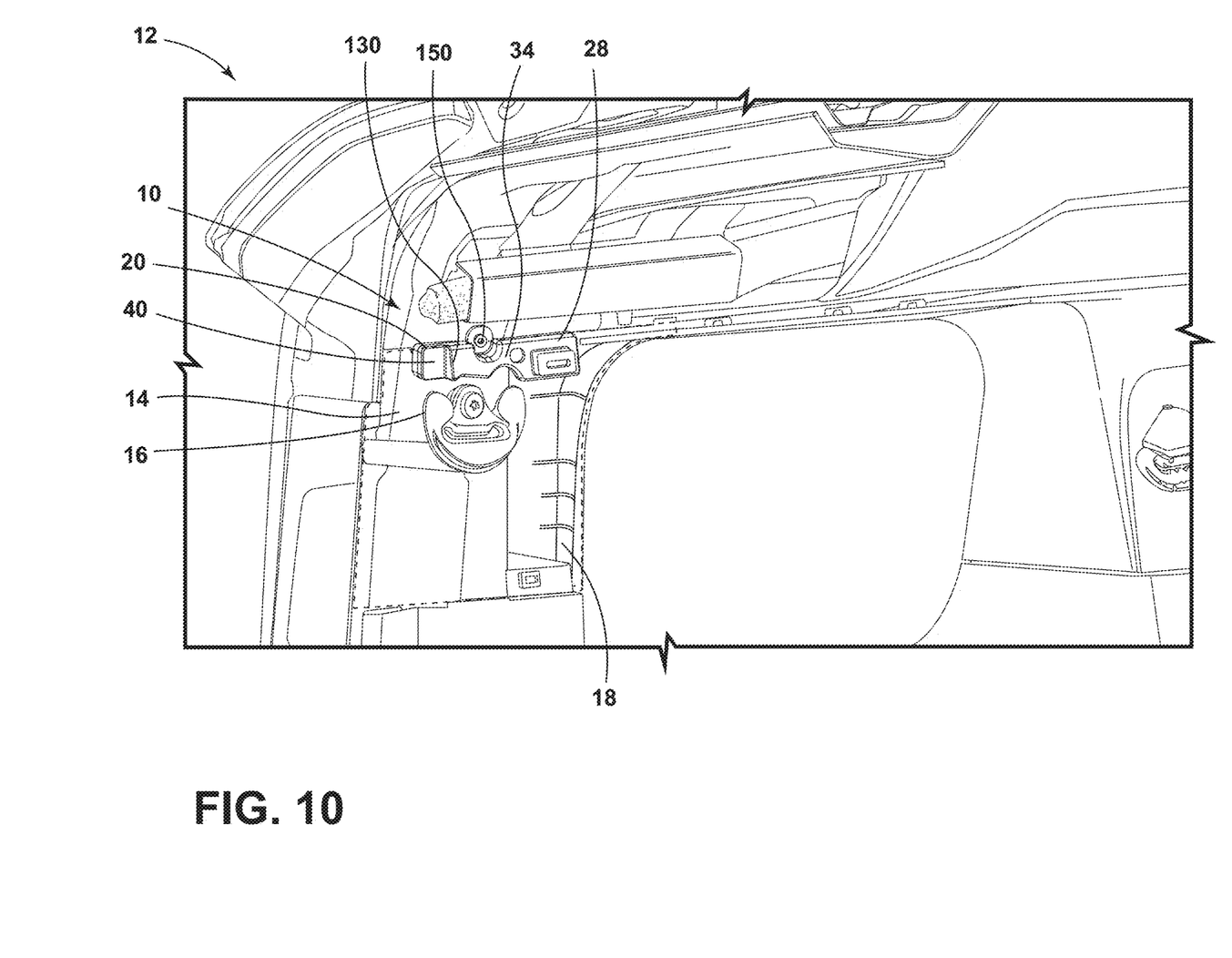
FIG. 10 is a partial side perspective view of a pillar assembly of the present disclosure.
Figure 11:
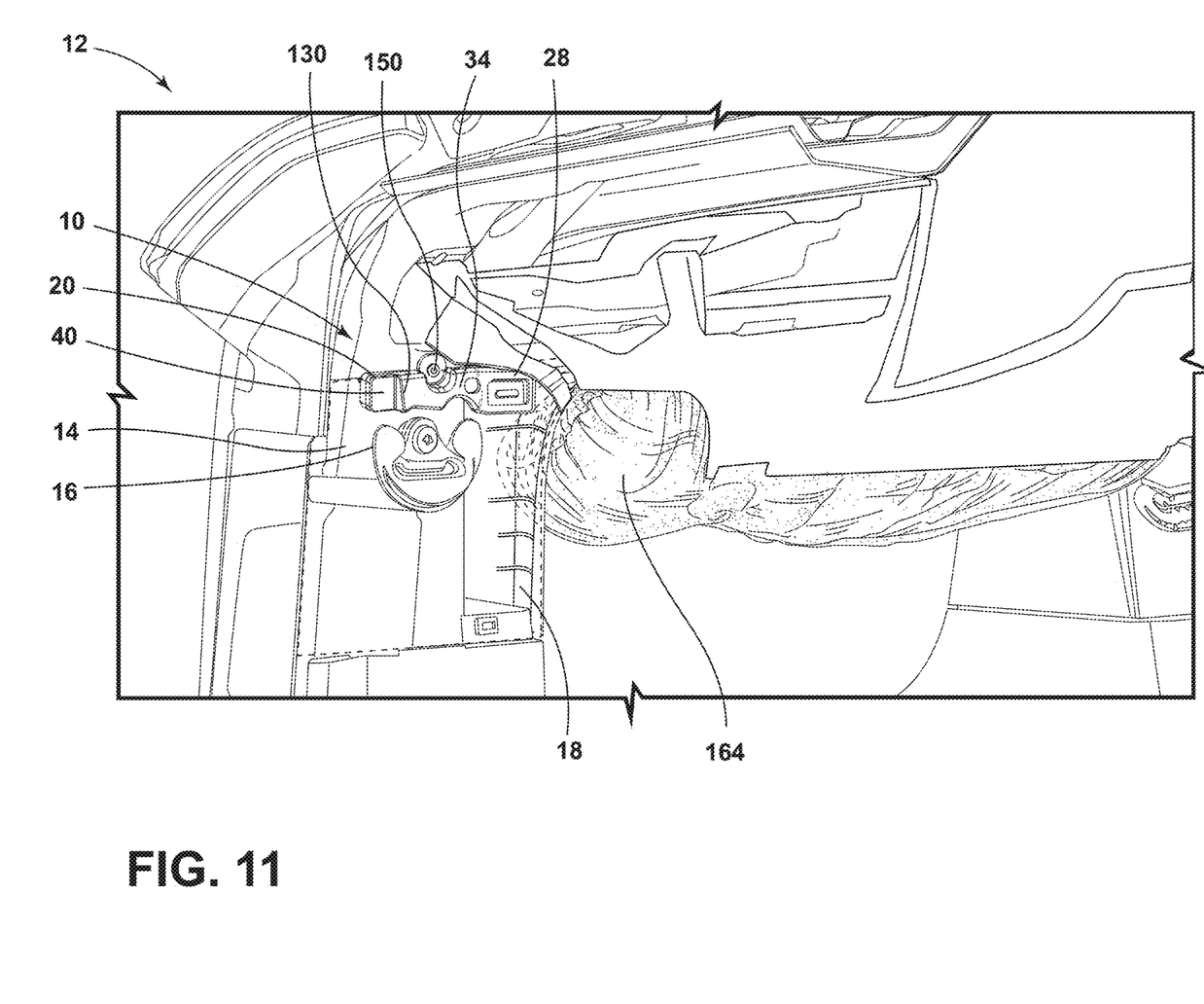
FIG. 11 is a partial side perspective view of the pillar assembly of FIG. 10 with an inflatable curtain partially deployed.
Figure 12:
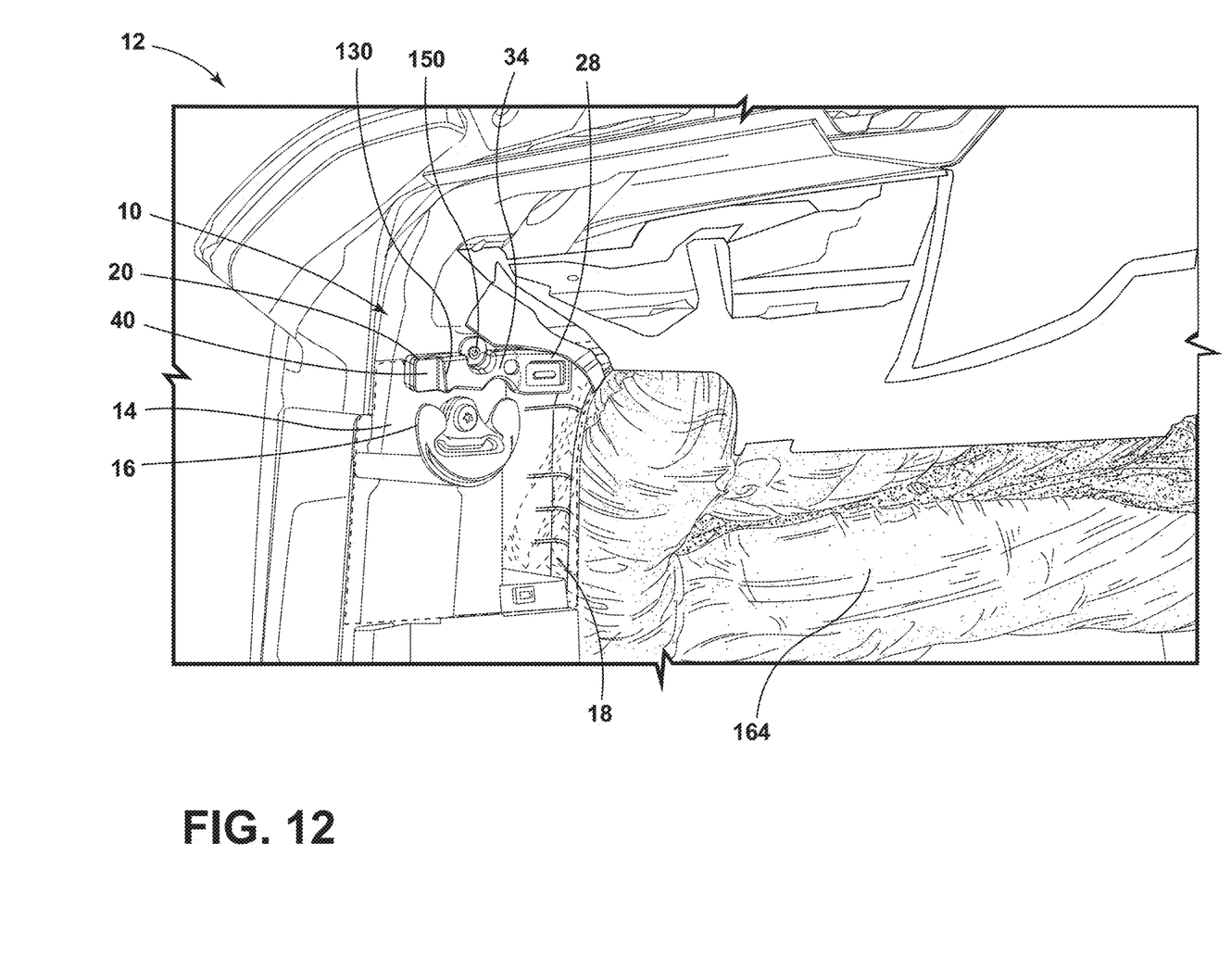
FIG. 12 is a partial side perspective view of the pillar assembly of FIG. 11 with the inflatable curtain fully deployed.

As illustrated in FIG. 9, the single rib 168 on the cantilevered end 28 may extend above the recess 160 of the raised attachment portion 30. The single rib 168 structurally supports the attachment of the trim panel 90 to the trim fastener 98 disposed within the attachment aperture 162, while still retaining the resiliency and flexibility of the cantilevered end 28. The cantilevered end 28 may flex slightly to accommodate the potential engagement of the inflatable curtain 164 upon the application of the predetermined level of force. While the cantilevered end 28 may be flexible, the bracket 20 may overall be structurally rigid to retain the trim panel 90 over the pillar 14 and the duct 18.

Referring again to FIGS. 1-12, the bracket 20 provides multiple attachment points and coupling features so the trim panel 90 may cover both the duct 18 and the pillar 14 while leaving the duct 18 free from penetration. The bracket 20 further minimizes interference with the pivoting bracket 16 by defining the notch 36 in the central portion 34 of the bracket 20. The second end 114 of the pivoting bracket 16 may pivot upward into the notch 36 in the extended position 124, for example, when the occupant extends the restraint belt 120. The bracket 20 is coupled to the pillar 14 to retain the trim panel 90 and also includes the retention feature 32 to retain the hose 156 proximate to the pillar 14 and the duct 18. Thus, the bracket 20 includes a multitude of attachment points to accommodate the various features typically found proximate to the pillar 14 and the duct 18, such that the single bracket 20 provides a variety of attachment solutions within the pillar assembly 10.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A pillar assembly for a vehicle, comprising:
   a pillar;
   a pivoting bracket coupled to the pillar;
   a duct proximate to the pillar; and
   a bracket coupled to the pillar, the bracket comprising:
      a first surface and a second surface;
      a cantilevered end extending past the duct and defining a raised attachment portion;
      a retention feature coupled to the cantilevered end;
      a central portion defining a notch and a fastening aperture; and
      an attachment end including a coupling feature, the attachment end coupled to the pillar via the coupling feature.

2. The pillar assembly of claim 1, wherein the raised attachment portion defines an attachment aperture, and wherein an attachment feature extends through the attachment aperture.

3. The pillar assembly of claim 1, wherein the pivoting bracket is selectively disposed within the notch defined by the central portion.

4. The pillar assembly of claim 1, further comprising:
   a trim panel operably coupled to the cantilevered end of the bracket.

5. The pillar assembly of claim 4, wherein the cantilevered end retains the trim panel over the duct.

6. The pillar assembly of claim 1, wherein one or more ribs are defined by the first surface are configured to brace the bracket.

7. The pillar assembly of claim 1, wherein the central portion further defines a locating aperture proximate to the notch.

8. The pillar assembly of claim 7, further comprising:
a trim panel including a locating feature extending through the locating aperture, wherein the locating feature aligns the trim panel relative to the pillar.

9. A pillar assembly, comprising:
a pillar; and
a bracket operably coupled to the pillar, the bracket comprising:
an attachment end including a coupling feature, the attachment end coupled to the pillar via the coupling feature;
a central portion defining a notch and a fastening aperture;
a cantilevered end defining a raised attachment portion; and
a fastener operably coupled to the cantilevered end and extending through the raised attachment portion.

10. The pillar assembly of claim 9, further comprising:
a duct proximate to the pillar, wherein the cantilevered end of the bracket extends beyond the pillar over the duct.

11. The pillar assembly of claim 10, further comprising:
a trim panel coupled to the cantilevered end via the fastener, wherein the trim panel covers the duct.

12. The pillar assembly of claim 11, wherein the central portion further defines a locating aperture proximate to the notch, and wherein the trim panel includes a locating feature that extends through the locating aperture to align the trim panel relative to the pillar.

13. The pillar assembly of claim 9, wherein the bracket further includes a retention feature extending from an upper edge of the cantilevered end.

14. The pillar assembly of claim 13, wherein the retention feature defines a retention notch configured to receive a hose of said pillar assembly.

15. A bracket for a vehicle, comprising:
a first surface defining support ribs;
a second surface;
a cantilevered end defining an attachment aperture;
a retention feature coupled to an upper edge of the cantilevered end and defining a retention notch;
a central portion defining an arcuate notch and a fastening aperture; and
an attachment end including a coupling feature extending outwardly from the first surface.

16. The bracket of claim 15, wherein the cantilevered end includes a raised attachment portion, and wherein the attachment aperture defined by the cantilevered end is further defined by the raised attachment portion.

17. The bracket of claim 16, further comprising:
a fastener extending through the attachment aperture defined by the raised attachment portion, wherein a first portion of the fastener is positioned proximate to the first surface and a second portion of the fastener extends outwardly from the second surface.

18. The bracket of claim 16, further including:
a peripheral wall defining the first surface, and wherein the first surface is recessed relative to the peripheral wall.

19. The bracket of claim 15, wherein the retention notch defined by the retention feature is configured to receive a hose of said vehicle.

20. The bracket of claim 15, further comprising:
a fastening portion coupled to the central portion, the fastening portion defining the fastening aperture.

* * * * *